US011067092B2

(12) United States Patent
Hero et al.

(10) Patent No.: US 11,067,092 B2
(45) Date of Patent: Jul. 20, 2021

(54) SIDE-CHANNEL COMPRESSOR FOR A FUEL CELL SYSTEM FOR CONVEYING AND/OR COMPRESSING A GASEOUS MEDIA

(71) Applicant: Robert Bosch GmbH, Stuttgart (DE)

(72) Inventors: Alexander Hero, Lehrensteinsfeld (DE); Armin Merz, Weinstadt (DE)

(73) Assignee: Robert Bosch GmbH, Stuttgart (DE)

(*) Notice: Subject to any disclaimer, the term of this patent is extended or adjusted under 35 U.S.C. 154(b) by 8 days.

(21) Appl. No.: 16/645,562

(22) PCT Filed: Jul. 31, 2018

(86) PCT No.: PCT/EP2018/070711
§ 371 (c)(1),
(2) Date: Mar. 9, 2020

(87) PCT Pub. No.: WO2019/048140
PCT Pub. Date: Mar. 14, 2019

(65) Prior Publication Data
US 2020/0277963 A1    Sep. 3, 2020

(30) Foreign Application Priority Data

Sep. 7, 2017    (DE) ..................... 10 2017 215 739.9

(51) Int. Cl.
*F04D 23/00*    (2006.01)
*F04D 29/30*    (2006.01)
(Continued)

(52) U.S. Cl.
CPC ........... *F04D 29/30* (2013.01); *F04D 23/008* (2013.01); *B01D 45/14* (2013.01); *F04D 29/284* (2013.01);
(Continued)

(58) Field of Classification Search
CPC ............ F04D 23/008; H01M 8/04164; H01M 8/04179; H01M 8/04156; H01M 8/04089;
(Continued)

(56) References Cited

U.S. PATENT DOCUMENTS 5,310,308 A * 5/1994 Yu ......................... F04D 29/188
415/55.2
7,354,669 B2 * 4/2008 Hobmeyr .............. F04D 23/008
429/415
(Continued)

FOREIGN PATENT DOCUMENTS

| CN | 1147601 A | 4/1997 |
| CN | 1601114 A | 3/2005 |

(Continued)

OTHER PUBLICATIONS

International Search Report for Application No. PCT/EP2018/070711 dated Oct. 15, 2018 (English Translation, 2 pages).

*Primary Examiner* — Justin D Seabe
(74) *Attorney, Agent, or Firm* — Michael Best & Friedrich LLP

(57) ABSTRACT

Side-channel compressor (1) for a fuel cell system (37) for conveying and/or compressing a gas, in particular hydrogen, having a housing (3), wherein the housing (3) has a housing upper part (7) and a housing lower part (8), having a compressor chamber (30) which is situated in the housing (3) and which has at least one encircling side channel (19), having a compressor wheel (2) which is situated in the housing (3) and which is disposed so as to be rotatable about a rotation axis (4), wherein the compressor wheel (2) on the circumference thereof has blades (5) which are disposed in the region of the compressor chamber (30), and having a gas inlet opening (14) and a gas outlet opening (16) which are in each case configured on the housing (3) and which by way of the compressor chamber (30), in particular the at least one (Continued)

side channel (19), are fluidically connected to one another. According to the invention, the compressor wheel (4) herein has at least one connection bore (21) which in a radial manner to the rotation axis (4) runs through at least one of the blades (5) and which connects an internal chamber (44) of the side-channel compressor (1) to a separation chamber (34).

18 Claims, 4 Drawing Sheets

(51) Int. Cl.
*B01D 45/14* (2006.01)
*F04D 29/28* (2006.01)

(52) U.S. Cl.
CPC .. *F05D 2240/303* (2013.01); *F05D 2260/602* (2013.01)

(58) Field of Classification Search
CPC .......... H01M 8/04097; H01M 8/04111; B01D 45/14
See application file for complete search history.

(56) References Cited

U.S. PATENT DOCUMENTS

| | | | | |
|---|---|---|---|---|
| 8,070,417 | B2 * | 12/2011 | Ikeya | F04D 29/188 415/55.1 |
| 8,297,913 | B2 * | 10/2012 | Hanai | F04D 29/0413 415/55.1 |
| 8,662,822 | B2 * | 3/2014 | Dittmar | F04D 29/403 415/55.2 |
| 2011/0052378 | A1 | 3/2011 | Dittmar et al. | |

FOREIGN PATENT DOCUMENTS

| | | |
|---|---|---|
| CN | 101849110 A | 9/2010 |
| CN | 102640339 A | 8/2012 |
| CN | 204213036 U | 3/2015 |
| DE | 733758 C | 4/1943 |
| DE | 10314820 | 12/2004 |
| DE | 102007053016 | 5/2009 |
| DE | 102015000264 A1 | 7/2016 |
| DE | 102015224223 | 6/2017 |
| GB | 2126652 A | 3/1984 |
| JP | 07167472 | 7/1995 |
| WO | 0068577 A1 | 11/2000 |

\* cited by examiner (A-A)

(C-C)

SIDE-CHANNEL COMPRESSOR FOR A FUEL CELL SYSTEM FOR CONVEYING AND/OR COMPRESSING A GASEOUS MEDIA

BACKGROUND OF THE INVENTION

The present invention relates to a side-channel compressor for a fuel cell system for conveying and/or compressing a gaseous medium, in particular hydrogen, which in particular is provided for use in fuel cell powered vehicles.

Besides liquid fuels, gaseous fuels will also become increasingly important in the automotive sector in the future. Hydrogen gas flows have to be controlled in particular in the case of vehicles powered by fuel cells. The gas flows herein are no longer discontinuously controlled, as is the case when injecting liquid fuel, but the gas is retrieved from at least one high-pressure tank and by way of a supply line of a medium-pressure line system is dissipated to an ejector unit. Said ejector unit by way of a connecting line of a low-pressure line system guides said gas to a fuel cell. Once the gas has flowed through the fuel cell, said gas by way of a return line is guided back to the ejector unit. The side-channel compressor which in terms of fluid control and efficiency technology facilitates the return of the gas can intervene herein. Moreover, side-channel compressors are used for facilitating the build-up of a flow in fuel-cell drive system, in particular when (cold) starting the vehicle after having been stationary for a certain time. Driving said side-channel compressors usually takes place by way of a drive, in particular an electric drive, which when operating in vehicles is supplied with voltage by way of the vehicle battery.

A side-channel compressor for a fuel cell system in which a gaseous medium is conveyed and/or compressed is known from DE 10 2007 053 016 A1. The side-channel compressor has a compressor wheel which revolves in a housing and which is fastened to a drive shaft and is set in rotation by a drive. The compressor wheel herein has an inner encircling delimitation ring which in an encircling manner runs about a rotation axis. Blades are situated in the region of a compressor chamber on said compressor wheel, conveyor cells being in each case configured between said blades. The blades interact with at least one side channel which is configured so as to be annular and encircle the rotation axis. The blades herein are configured so as to be flat, and a blade contour runs in a planar manner in the direction of the rotation axis. A circulating flow is configured between the blade and the side channel when the compressor wheel rotates in the housing, energy being introduced from the compressor wheel into the gaseous medium on account thereof. The gaseous medium herein flows axially, in the direction of the rotation axis, into the inner region of the conveyor cell that faces the inner delimitation ring, and exits in an axial manner or radial in relation to the rotation axis into the region of the outer region of the conveyor cell that faces away from the inner delimitation ring. The gaseous medium when flowing through the conveyor cell of the blade is imparted a change in terms of spin, a pressure increase in the encircling side channel being caused on account thereof.

The side-channel compressor known from DE 10 2007 053 016 A1 can have specific disadvantages. The formation of liquid water, in particular by condensation from the gaseous medium, can arise in an internal chamber of the side-channel compressor in the fuel cell system when the side-channel compressor is used in particular as a recirculation blower. In the switched-off state of the fuel cell system in the vehicle, said water at low ambient temperatures is deposited on the pipelines of the system or else on the rotating parts of the side-channel compressor, such as the bearings, the shaft, or the compressor wheel. In the case of the formation of large ice bridges, this can lead to the drive blocking when starting the vehicle and thus the fuel cell system on account of which the rotating parts, in particular the compressor wheel, can be damaged, and/or starting the system is impeded or delayed, respectively, or is completely prevented.

Furthermore, in the case of condensation of water and further heavy component parts from the gaseous medium, such as nitrogen, for example, this can lead to said component parts accumulating in the internal chamber of the side-channel compressor and further invading the inside region of the side-channel compressor and damaging the components situated therein. This applies in particular to components that are sensitive to the ingress of liquid, such as the drive shaft, the bearings, and the drive, in particular in the form of an electric drive.

SUMMARY OF THE INVENTION

Proposed according to the invention is a side-channel compressor for a fuel cell system, for conveying and/or compressing a gaseous medium, in particular hydrogen.

According to the invention, the side-channel compressor is configured in such a manner that a compressor wheel has at least one connection bore which in a radial manner to be rotation axis runs through at least one blade and which connects an internal chamber of the side-channel compressor to a separation chamber. In this way, heavy component parts of the gaseous medium to be conveyed which have condensed from the latter and have accumulated in the region of the internal chamber of the side-channel compressor can be directed in a radial manner to the rotation axis into the outside region of the side-channel compressor, in particular into the separation chamber. Moreover, on account of the geometric arrangement of the connection bore in a radial manner to the rotation axis, a centrifugal force acts on the heavy component parts of the gaseous medium to be conveyed when the compressor wheel rotates, and the heavy component parts are automatically transported through the connection bore into the region of the separation chamber. To this end, no further measures on the side-channel compression in terms of construction, such as for example the use of a pump for generating a positive pressure in the internal chamber or for generating a negative pressure in the separation chamber, are required in order for the conveying effect to be initiated. This offers the advantage that the component and assembling costs for further components, such as for example the pump, can be saved. Furthermore, damage to the inside components and the rotating components, such as for example the compressor wheel, can be prevented on account of the heavy component parts, such as water and/or hydrogen, being actively dissipated in a self-acting manner from the internal chamber of the side-channel compressor. On account thereof, the probability of a breakdown of the compressor wheel and/or of a drive can be reduced, on account of which the service life of the entire side-channel compressor can be increased.

According to one advantageous design embodiment, the compressor wheel in the region of a compressor chamber between in each case two neighboring blades configures in each case one conveyor cell. Said conveyor cell in a radial manner to the rotation axis is outwardly delimited by an outer encircling delimitation ring and is inwardly delimited by an inner encircling delimitation ring of the compressor wheel. The conveyor cell herein in the direction of the rotation axis has at least one opening. The outer delimitation ring and the inner delimitation ring herein run so as to be rotationally symmetrical to the rotation axis. Furthermore, the at least one opening is configured on that side of the conveyor cell of the compressor wheel that faces an at least one side channel of the housing. It can be achieved in this way that the flow of the gaseous medium, in particular a circulating flow, flows only in an axial manner to the rotation axis to and from the conveyor cell, only an axial movement of the gaseous medium between the at least one side channel and the conveyor cell thus being established. This offers the advantage that a flow of the gaseous medium is established only in the region in which said flow is desired, specifically between the side channel and the conveyor cell. Frictional losses by virtue of friction between the medium and other regions of the side-channel compressor which do not cause improved conveying and compressing of the gaseous medium can be largely reduced and/or avoided, on account of which the efficiency factor of the side-channel compressor can be increased. Moreover, an undesirable increase in the temperature of the gaseous medium by virtue of friction can be minimized.

According to one particularly advantageous design embodiment, the connection bore runs completely through the respective blade of the compressor wheel, wherein the connection bore is in particular completely enclosed by the material of the blade. It is prevented in this way that the heavy component parts when flowing through the connection bore can escape into the region of the conveyor cell or of the side channel, which would have a disadvantageous effect on the compressing and conveying process, since heavy component parts fed into the region of the side channel and/or the conveyor cell reduce the efficiency factor of the side-channel compressor, less hydrogen thus being able to be conveyed. Rather, the heavy component parts, on account of the geometric embodiment of the connection bore which is completely enclosed by the material of the blade, when discharging are efficiently encapsulated by the conveyor cell and the side channel. The component parts by way of the design embodiment of the connection bore according to the invention are thus directed from the internal chamber to the separation chamber in such a manner that any leakage from the connection bore into the region of the at least one encircling side channel and/or of the conveyor cell is prevented when dissipating the heavy component parts from the internal chamber. A high efficiency factor of the side-channel compressor can be at least maintained or even increased on account of the efficient discharge of the undesirable and disadvantageous heavy component parts in the side-channel compressor and/or fuel cell system, on the one hand. On the other hand, the efficiency factor of the entire fuel cell system can be increased since the undesirable heavy component parts, such as for example water or hydrogen, can already be discharged from the fuel cell system shortly after they arise, for example after the electric power generation process in a fuel cell has been performed.

According to one advantageous refinement, the region of the conveyor cell and/or of the at least one side channel is at least partially encapsulated in relation to the internal chamber. The internal chamber herein is in particular situated in a radial manner to the rotation axis, between the inner delimitation ring and the rotation axis. Furthermore, the compressor wheel on the inner delimitation ring has at least one inside encircling annular bead which runs in particular in a radial manner to the rotation axis and which runs on that side of the inner delimitation ring that faces the rotation axis. An at least partial encapsulation of the region of the conveyor cell and/or of the at least one side channel in relation to the internal chamber herein is achieved on account of the at least one inside encircling annular bead. It is prevented in this way that neither hydrogen nor the heavy component parts from the region of the compressor chamber further invade the inside encapsulated region of the side-channel compressor in which components which can be damaged by hydrogen and/or by the heavy component parts are situated. The service life of a bearing, of a drive shaft, or of further components which are situated in the internal chamber of the side-channel compressor, can thus be increased, for example. The reason therefor lies in that damage to the components, in particular on account of corrosion by contact with water, is prevented by the encapsulation. Furthermore prevented is electrical shorting on account of ingress of liquid into the electrical components, since all electrical components, such as for example the drive, are situated in the internal chamber or in a region of the side-channel compressor that is adjacent to the internal chamber, and thus are protected against liquid. The probability of a breakdown of the side-channel compressor is reduced, and the service life of the fuel cell system can be increased, on account thereof.

According to one advantageous design embodiment, the region of the conveyor cell and/or of the at least one side channel are/is at least partially encapsulated by the separation chamber, wherein the separation chamber is in particular situated in a radial manner to the rotation axis, between the outer delimitation ring and a housing upper part and/or a housing lower part. In this way it is possible in the case of heavy component parts being condensed from or configured in the gaseous medium for said component parts to be able to be discharged from the region of the conveyor cell and/or the at least one side-channel into the separation chamber. The discharge of the heavy component parts herein takes place by way of the centrifugal force which is exerted on the gaseous medium on account of the rotation of the compressor wheel, the heavy component parts on account of said centrifugal force moving from the region of the at least one side channel and/or of the conveyor cell in an outflow direction away from the rotation axis, between a housing and an outside encircling annular bead, through to the encapsulated separation chamber. An outflow of the heavy component parts herein is possible only in the case of a rotating compressor wheel, and also only in one direction, in particular from the conveyor cell and/or the side channel in the direction of the separation chamber. A return flow is not possible by virtue of the gap width between the housing and the compressor wheel, in particular the outside annular bead. The advantage that damage, in particular on account of corrosion, to the surfaces of the side channel and/or the conveyor cell by the heavy component parts is prevented on account thereof can be achieved, this leading to an increased service life of the entire side-channel compressor. The design embodiment of the side-channel compressor according to the invention furthermore offers the advantage that the efficiency and the efficiency factor of the fuel cell system can be increased since the undesirable heavy component parts, which are in particular not hydrogen and which do not contribute toward generating power in the fuel cell system, are discharged from the system, on the one hand. The efficiency factor of the fuel cell system can be increased on account thereof. Furthermore, the efficiency and the efficiency factor of the side-channel compressor can be increased since the heavy component parts, in particular water and/or nitrogen, mean a higher input of energy when conveyed and/or compressed by the side-channel compressor, in particular in comparison with hydrogen, in particular when starting the side-channel compressor.

According to one particularly advantageous design embodiment, the compressor wheel on the outer delimitation ring has at least one outside encircling annular bead which runs in particular in a radial manner to the rotation axis. The outside annular bead herein runs on that side of the outer delimitation ring that faces away from the rotation axis. Furthermore, the at least one outside encircling annular bead in an axial manner and/or radial to the rotation axis bears on the housing upper part and/or the housing lower part. The advantage that an at least partial encapsulation of the at least one side channel and/or of the conveyor cell in relation to an outer region in the housing, in particular in relation to the separation chamber, is established in this way, can be achieved on the one hand. On the other hand, the advantage that improved guiding of the compressor wheel in the housing takes place on account of the at least one outside encircling annular bead which in an axial manner and/or radial to the second symmetry axis bears on the housing upper part and/or the housing lower part can be achieved. It is furthermore achieved on account thereof that fewer longitudinal and transverse forces arise during the operation of the side-channel compressor, and thus fewer damaging impulse forces such as, for example, shocks arise on the compressor wheel, the housing, the bearings, and a drive. The service life of the entire side-channel compressor can be increased on account thereof. Furthermore, noise emissions from the operation of the side-channel compressor can be improved by virtue of the improved guiding of the compressor wheel by means of the outside encircling annular bead.

According to one advantageous design embodiment, the at least one inside encircling annular bead in an axial manner and/or radial to the rotation axis bears on the housing upper part and/or the housing lower part. Furthermore, the at least one outside encircling annular bead in an axial manner and/or radial to the rotation axis also bears on the housing upper part and/or the housing lower part. The advantage that the compressor wheel is better guided in the housing can be achieved in this way. Furthermore, fewer longitudinal and transverse forces will arise during the operation of the side-channel compressor, and thus fewer damaging impulse forces such as, for example, shocks will arise on the compressor wheel, the housing, the bearings, and a drive, on account thereof. The service life of the entire side-channel compressor can be increased on account thereof. Furthermore, noise emissions from the operation of the side-channel compressor can be improved by virtue of the improved guiding of the compressor wheel by means of the outside encircling annular bead.

According to one particularly advantageous design embodiment, a discharge channel is situated on that side of the separation chamber that faces away from the rotation axis in the housing upper part and/or in the housing lower part and/or between the housing upper part and the housing lower part. In this way, the advantage that the heavy component parts which are discharged from the compressor chamber of the side-channel compressor into the separation chamber are discharged farther from the housing of the side-channel compressor and the fuel cell system can be achieved, on account of which it is achieved that a follow-on flow of the heavy component parts into the separation chamber is prevented since the volume of the separation chamber is completely filled, which in turn would prevent the heavy component parts continuing to be discharged from the compressor chamber. This offers the advantage that an increase in the efficiency factor of the side-channel compressor and/or of the fuel cell system can be maintained over the entire service life. By directing the heavy component parts such as liquid water from the region of the compressor chamber, the advantage that so-called ice bridges are prevented from forming between the movable parts, in particular the compressor wheel and the housing, in the switched-off state of the fuel cell system and at low ambient temperatures, is furthermore achieved. Ice bridges of this type would impede or completely prevent starting of the fuel cell system, in particular of the side-channel compressor. Damage to the rotating parts of the side-channel compressor and/or of a drive, in particular an electric drive, by virtue of the formation of ice bridges can thus be prevented on account of the design embodiment of the side-channel compressor according to the invention. This leads to a higher degree of reliability of the fuel cell system and/or of the vehicle.

According to one advantageous refinement, the discharge channel is situated at the geodetically lowest point in the housing upper part and/or in the housing lower part and/or between the housing upper part and the housing lower part, in particular in the acting direction of gravity. The discharge channel herein runs in particular so as to be inclined at an angle in relation to the rotation axis. The advantage that the heavy component parts can be discharged from the side-channel compressor by gravity, without any further input of energy, in particular without any input of energy of the drive, can be achieved in this way. This offers the advantage that an increase in terms of the service life and of the efficiency factor of the side-channel compressor can be achieved without any further input of energy and thus operating costs.

Since the discharge channel runs so as to be inclined at an angle in relation to the rotation axis, the advantage that the installed position of the side-channel compressor in the fuel cell system and/or in the vehicle can be adapted within a conical angular range to the requirements of the customer can be achieved. The alignment of the discharge channel parallel with the acting direction of gravity herein can be subsequently adapted in the housing of the side-channel compressor, in particular away from the separation chamber, in that the discharge channel is introduced into the housing in such a manner. This offers the advantage of being able to cater for a greater variance in terms of installed positions, in particular in different fuel cell systems and/or vehicles, using the same side-channel compressor, in that the variance adaptation can be implemented only by introducing the discharge channel into the housing at a specific angle.

BRIEF DESCRIPTION OF THE DRAWINGS

The invention will be described in more detail below by means of the drawings.

In the drawings.

DETAILED DESCRIPTION

Figure 1:
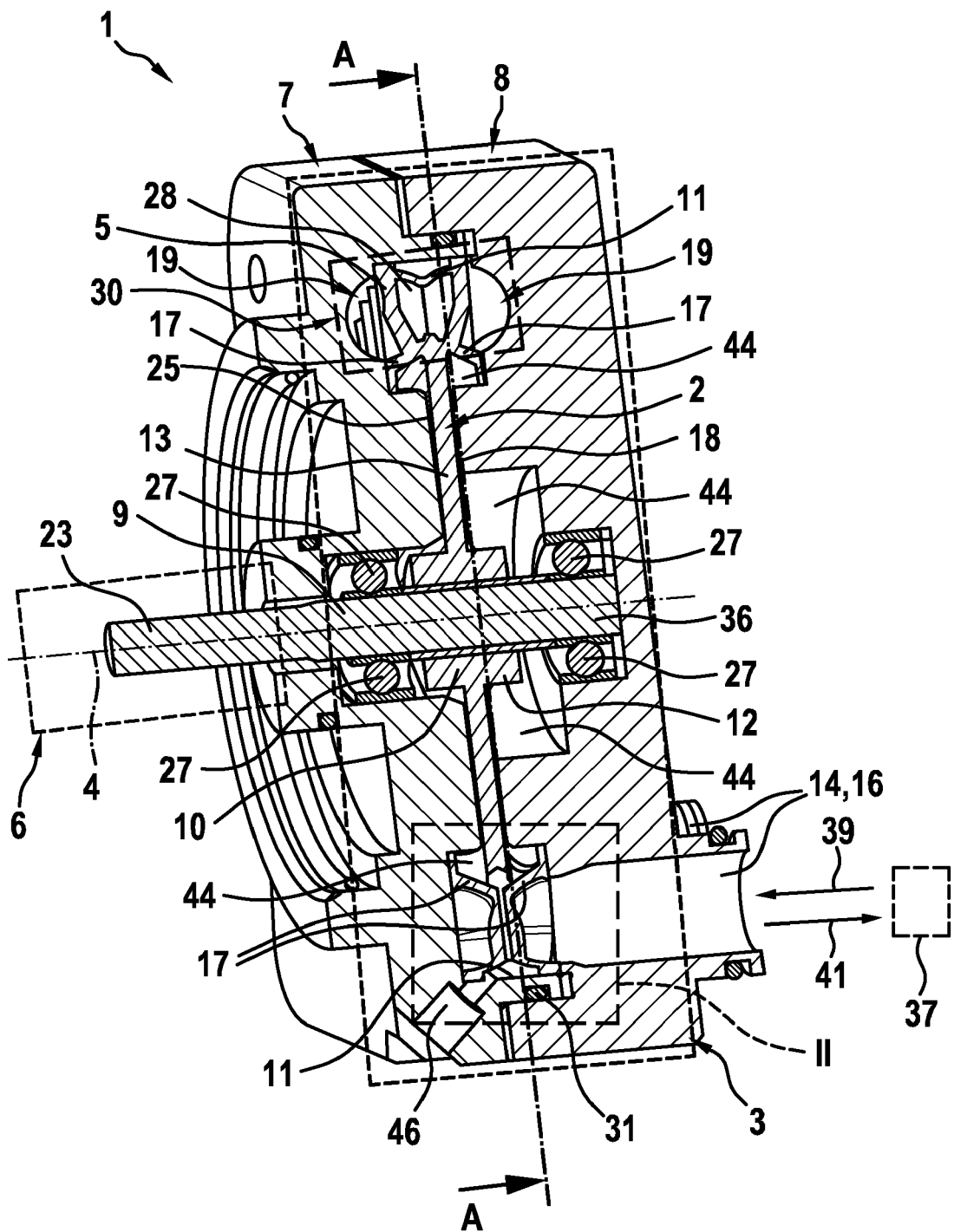
FIG. 1 shows a schematic sectional view of a side-channel compressor according to the invention.

A longitudinal section through a side-channel compressor 1 can be derived from the illustration according to FIG. 1, said side-channel compressor 1 being proposed according to the invention and configured so as to be rotationally symmetrical to a rotation axis 4. The side-channel compressor 1 herein has a compressor wheel 2 which is in particular configured as a closed disk-type compressor wheel 2 and is mounted in a housing 3 so as to be rotatable about the horizontally running rotation axis 4. The housing 3 comprises a housing upper part 7 and a housing lower part 8 which are connected to one another, wherein a sealing element 31, in particular an O-ring, that encircles the rotation axis 4 is disposed between the housing upper part 7 and the housing lower part 8. The sealing element 31 herein has the effect of an encapsulation of a compressor chamber 30 of the side-channel compressor 1, in particular in relation to contamination or moisture from the outside. The compressor wheel 2 is furthermore disposed so as to be rotationally fixed on a drive shaft 9 and is enclosed by the housing upper part 7 and the housing lower part 8. The compressor wheel 2 has an inner compressor wheel hub 10, wherein the compressor wheel hub 10 has a clearance through which the drive shaft 9 is push-fitted, and wherein the compressor wheel hub 10 is in particular connected to the drive shaft 9 by way of a press-fit. Moreover, the compressor wheel hub 10 on that side that faces away from the rotation axis 4 is delimited in an encircling manner by a hub base 12. The compressor wheel 2, from the hub base 12 in an outward manner away from the rotation axis 4, configures an encircling circular hub disk 13. The compressor wheel 2 furthermore configures a conveyor cell 28 which adjoins the hub disk 13 on the external side. Said conveyor cell 28 of the compressor wheel 2 in the encircling compressor chamber 30 of the housing 3 runs in an encircling manner about the rotation axis 4, wherein the compressor wheel 2 and/or the conveyor cell 28 on the respective outside circumference have/has an outer encircling delimitation ring 11, wherein the outer delimitation ring 11 delimits in particular the conveyor cell 28 on the external diameter of the latter that encircles the rotation axis 4. The sectioned contour of a blade 5 can furthermore be seen in the region of the conveyor cell 28 in FIG. 1. Said blade 5 in a rotation direction 20 (see FIG. 2) of the compressor wheel 2 has a V-shaped contour, wherein the blade 5 in the region of an inner encircling delimitation ring 11 in the rotation direction 20 moreover has a leading contour, and in the region of the outer delimitation ring 11 in the rotation direction 20 has a recessed contour. This is moreover shown and described in detail in FIG. 3 and FIG. 4 hereunder. Furthermore, the conveyor cell 28 on the respective inside circumference has the encircling inner delimitation ring 11 which delimits the conveyor cell 28 on the internal diameter thereof that encircles the rotation axis 4. The respective conveyor cell 28 in the rotation direction 20 is furthermore delimited by two blades 5, wherein a number of blades 5 in an encircling manner about the rotation axis 4 are disposed on the compressor wheel 2 in a radial manner to the rotation axis 4, between the inner delimitation ring 17 and the outer delimitation ring 11.

The housing 3, in particular the housing upper part 7 and/or the housing lower part 8, in the region of the compressor chamber 30 furthermore has/have at least one encircling side channel 19. The side channel 19 in the housing 3 herein runs in the direction of the rotation axis 4 in such a manner that said side channel 19 runs on one side or both sides in an axial manner to the conveyor cell 28. The side channel 19 at least in a sub-region of the housing 3 herein can run in an encircling manner about the rotation axis 4, wherein an intervening region 15 in the housing 3 is configured in the sub-region in which the side channel 19 is not configured in the housing 3 (see FIG. 2).

The drive shaft 9 by way of an end portion 23, at least in cardanic terms, in an axial manner to the rotation axis 4, is connected to a drive 6 (not explicitly illustrated). The drive 6, in particular an electric drive 6, herein can serve as a rotary drive 6 of the compressor wheel 2. Moreover, a bearing 27 is situated on the external diameter of the drive shaft 9, so as to be axially in the region between the drive 6 and the compressor wheel 2, in particular between the drive 6 and the hub base 12 of the compressor wheel 2. The drive shaft 9 on the side thereof that faces away from the drive 6, in an axial manner to the rotation axis 4, configures a bearing journal 36, wherein a further bearing 27 is situated in the region of the bearing journal 36. The drive shaft 9, proceeding from the external diameter region thereof, in one potential embodiment has shoulders which in the axial direction run toward both shaft ends, the compressor wheel 2 being attached to said shoulders. The diameter of the drive shaft 9 in the region between the respective shoulder and the respective shaft end is in particular reduced in size in comparison with the larger shaft diameter region in which the drive shaft 9 is connected to the compressor wheel 2. The bearings 27 can be roller bearings 27, in particular ball bearings 27. The drive 6 can be connected to the housing 3 of the side-channel compressor 1, in particular to the housing upper part 7, in that the drive 6 by way of at least one end face, in an axial manner to the rotation axis 4, bears on an end face of the housing 3.

Moreover, the housing 3 configures a first side wall 18 and a second side wall 25, the hub disk 13 of the compressor wheel 2 being situated therebetween in an axial manner to the rotation axis 4. The first side wall 18 herein is in particular situated in the housing lower part 8, and the second side wall 25 is situated in the housing upper part 7. Furthermore, the housing 3, in particular the housing lower part 8, configures a gas inlet opening 14 and a gas outlet opening 16. The gas inlet opening 14 and the gas outlet opening 16 are fluidically connected to one another in particular by way of the at least one side channel 19.

A torque from the drive 6 is transmitted to the compressor wheel 2 by way of the drive shaft and the compressor wheel hub 10. The compressor wheel 2 herein is set in rotating motion, and the conveyor cell 28 in a rotating movement in encircling manner in the direction of a rotation direction 20 about the rotation axis 4 moves through the compressor chamber 30 in the housing 3 (see FIG. 2). A gaseous medium already situated in the compressor chamber 30 herein is entrained by the conveyor cell 28 and is conveyed and/or compressed herein. Moreover, a movement of the gaseous medium, in particular a fluidic exchange, takes place between the conveyor cell 28 and the at least one side channel 19. The side-channel compressor 1 by way of the gas inlet opening 14 and the gas outlet opening 16 is furthermore connected to a fuel cell system 37, wherein the gaseous medium, which is in particular a non-consumed recirculation medium from a fuel cell, by way of the gas inlet opening 14 is fed into the compressor chamber 30 of the side-channel compressor 1, and/or is fed to the side-channel compressor 1, and/or is suctioned from the region which is disposed upstream of the gas inlet opening 14. The gaseous medium upon passing through herein is dissipated away through the gas outlet opening 16 of the side-channel compressor 1 and flows, in particular in an outflow direction 41, to the fuel cell system 37.

It is furthermore illustrated in FIG. 1 that a discharge channel 46 is situated in the housing 3. Said discharge channel 46 in the exemplary embodiment of the side-channel compressor 1 shown is disposed in the housing upper part 7 at an oblique angle in relation to the rotation axis 4. However, the discharge channel 46 in another exemplary embodiment of the side-channel compressor 1 can also be situated in the housing lower part 8, or between the housing upper part 7 and the housing lower part 8.

It is furthermore illustrated in FIG. 1 that an at least partially encapsulated internal chamber 44 is situated on that side of the inner delimitation ring 17 that faces the rotation axis 4. Said encapsulated internal chamber 44 is situated in the housing 3, in particular in the encircling region between the rotation axis 4 and the compressor chamber 30. The region of the conveyor cell 28 and/or of the at least one side channel 19 herein are/is at least partially encapsulated in relation to the internal chamber 44, wherein the internal chamber 44 is in particular situated in a radial manner to the rotation axis 4, between the inner delimitation ring 17 and the rotation axis 4. The components, i.e. the bearings 27, the hub disk 13 of the compressor wheel 2, and at least partially the drive shaft 9 herein are situated in the internal chamber 44 of the housing 3.

It is moreover shown in FIG. 1 that the gaseous medium, for example from a fuel cell stack, flows into the side-channel compressor 1 in the inflow direction 39. The compression and/or the pressure and/or the flow rate of the gaseous medium in the conveyor cell, in particular in the conveyor cells 28 of the compressor wheel 2 and in the side channels 19, herein increases as the circulation progresses in the rotation direction 20 from the gas inlet opening 14 to the gas outlet opening 16. The gaseous medium upon passing through herein is dissipated away through the gas outlet opening 16 of the side-channel compressor 1 and flows out in the outflow direction 41, in particular in the direction of a jet pump of the fuel cell system 37. A separation of a pressure side in relation to a suction side is effected by the intervening region 15, wherein the suction side is situated in the region of the gas inlet opening 14, and the pressure side is situated in the region of the gas outlet opening 16.

Figure 2:
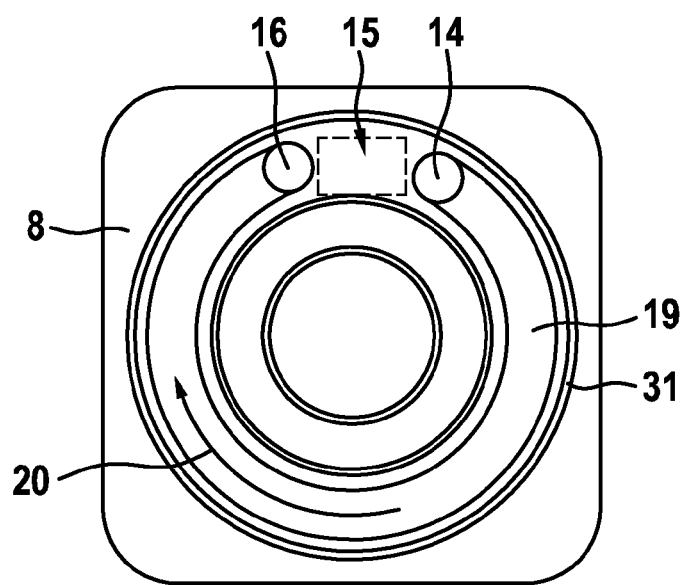
FIG. 2 shows a section of the side-channel compressor in an enlarged illustration, said section being identified by A-A in FIG. 1.

FIG. 2 shows a section of the side-channel compressor 1 in an enlarged illustration, said section being identified by A-A in FIG. 1, in which the housing lower part 8, the gas inlet opening 14, the gas outlet opening 16, an intervening region 15, the side channel 19, the rotation direction 20 (of the compressor wheel 2 not illustrated), and the encircling sealing element 31 are illustrated.

As is illustrated in FIG. 2, the intervening region 15 is situated in the housing 3, in particular between the gas inlet opening 14 and the gas outlet opening 16, so as to encircle the rotation axis 4. The gaseous medium is conveyed through the compressor wheel 2 and/or herein flows from the gas inlet opening 14 to the gas outlet opening 16 and herein, at least partially, flows through the side channel 19.

Figure 3:
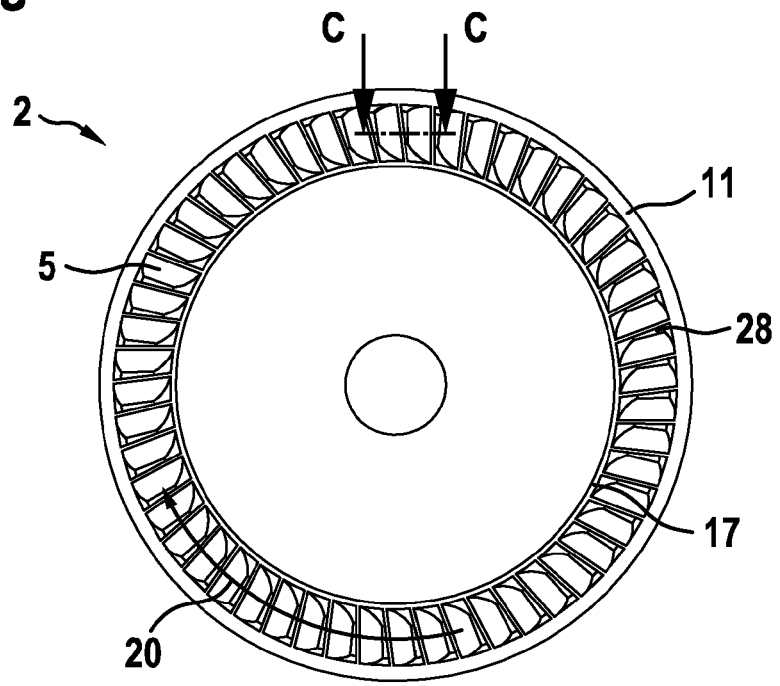
FIG. 3 shows a lateral view of a closed compressor wheel having V-shaped blades and conveyor cells.

A lateral view of the compressor wheel 2 having V-shaped blades 5 and conveyor cells 28 is shown in FIG. 3. The compressor wheel 2 herein is configured as a closed compressor wheel 2 by the encircling outer delimitation ring 11. The compressor wheel 2 in the exemplary embodiment of the side-channel compressor 1 shown has a multiplicity of V-shaped blades 5, wherein two V-shaped blades 5 in the rotation direction 20 delimit in each case one conveyor cell 28. The blades 5 herein in the region of the inner delimitation ring 17 in the rotation direction 20 have a leading contour, and in the region of the outer delimitation ring 11 in the rotation direction 20 have a recessed contour.

Figure 4:
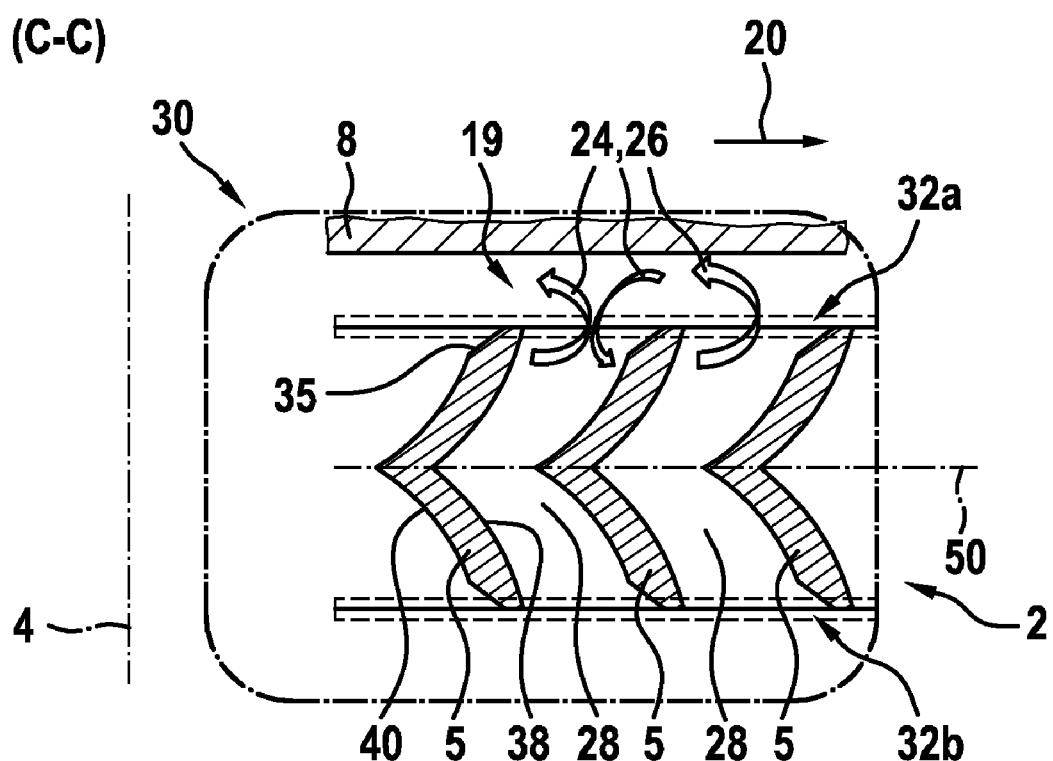
FIG. 4 shows a section of the compressor wheel and of the conveyor cells, said section being identified by C-C in FIG. 3, having an illustration of a blade geometry and a circulating flow in a side channel.

FIG. 4 shows a section of the compressor wheel 2 and of the conveyor cells 28, in particular of the blades 5, said section being identified by C-C in FIG. 3, having an illustration of a blade geometry and a circulating flow 24 in the side channel 19 and a region of the conveyor cell 28, wherein the compressor chamber 30 here is illustrated in a plan view. It is shown herein that the blades 5 in the rotation direction 20 have in each case a symmetrical V-shaped contour, wherein the symmetrical V-shaped contour of the blades 5 between two openings 32a,b runs in the direction of the rotation axis 4, and wherein the opened side of the symmetrical V-shaped contour is directed in the rotation direction 20 of the compressor wheel 2. The symmetry of the V-shaped contour of the blades 5 herein is mirror symmetrical to a first symmetry axis 50, wherein the first symmetry axis 50 runs so as to be parallel with the rotation direction 20 of the compressor wheel 2 and orthogonal to the rotation axis 4. It is moreover illustrated that the side channel 19 in a radial manner to the first symmetry axis is delimited by the housing lower part 8, on the one hand, and is delimited by the opening 32a of the conveyor cell 28 of the compressor wheel 2, on the other hand.

As soon as the compressor wheel 2 by means of the drive 6 from a stationary position is set in rotating motion in the rotation direction 20, a respective end side 38 of the blades 5 pushes the gaseous medium, in particular hydrogen, which is situated in the conveyor cell 28 from the region of the gas inlet opening 14 in the rotation direction 20 to the region of the gas outlet opening 16, wherein an acceleration and/or compression of the gaseous medium takes place. The gaseous medium herein by way of the end side 38 of the respective blade 5 is pushed forward in the direction of the rotation direction 20, on the one hand, and on account of the geometry of the blade, in particular by means of two guide contours, is pushed away from the first symmetry axis 50, on the other hand. The gaseous medium from the conveyor cell 28 herein is pushed in the rotation direction 20 from the first symmetry axis 50 into the respective side channel 19, wherein the gaseous medium is set in motion in the circulating flow 24, and wherein the gaseous medium flowing at a velocity out of the conveyor cell 28 meets a stationary gaseous medium in the side channel 19. The gaseous medium herein flows in a flow direction 26. A momentum exchange between the two media takes place herein, and energy on account of the gaseous medium set in motion in a circulating flow 24 is transferred to a conveyed flow on account of a momentum exchange, said conveyed flow being in particular the stationary gaseous medium situated in the side channel 19. The conversion from velocity energy to pressure energy takes place herein. The transfer of energy herein takes place multiple times on the entire length of the encircling side channel 19, and is a function of the number of blades 5 and conveyor cells 28. A large transfer of energy between the gaseous medium situated in the conveyor cell 28 and the gaseous medium situated in the side channel 19 is thus possible, and a build-up of pressure takes place in a linear manner by a momentum exchange across the circumference. This effect of energy transmission and of side-channel compression can be increased by the encircling delimitation ring 11, and the efficiency factor of the entire side-channel compressor 1 can be improved since it is now prevented that a majority of the gaseous medium in a radial manner to the rotation axis 4 flows from the conveyor cells 28 to a part of the housing 3 in which no side channel 19 is configured, and energy of the circulating flow 24 is thus lost since the gaseous medium in this region not situated in the side channel 19 conjointly with the housing 3 generates only frictional and thermal losses. Said losses can be completely prevented by the embodiment of the side-channel compressor 1 having the outer delimitation ring 11 (see FIG. 3), on account of which the efficiency factor and the conveying efficiency of the side-channel compressor 1 can be increased.

It is furthermore shown that at least one chamfer 35 is in each case configured on a rear side 40 of the at least two blades 5 that faces away from the rotating direction 20, wherein the at least one chamfer 35 runs in particular on the end of the respective blade 5 that faces an opening 32a,b. The flow properties of the side-channel compressor 1 can be improved by means of said chamfer 35, in particular when the gaseous medium which was set in motion in the circulating flow 24 flows from the side channel 19 back into the conveyor cell. When the gaseous medium flows the side channel 19 back into the conveyor cell, turbulence formation and/or a flow breakdown can arise as the gaseous medium flows past the rear side 40 and the region of the blade 5 that faces the side channel 19. The reason therefor lies in that the probability of turbulence formation and/or a flow breakdown of the gaseous medium is increased between the rear side 40 and the region of the blade 5 that faces the side channel 19, wherein an approximately right-angled edge is configured, this in turn leading to a reduced efficiency factor of the circulating flow 24 and thus of the side-channel compressor 1. The reason therefor lies in that a region on the rear side 40 of the blade in which the gaseous medium is almost stationary and has a minor pressure is created, and a region on the end face of the blade 5 that faces the side channel 19 in which the gaseous medium has a high flow velocity and a high pressure is created. This negative effect can be reduced by the configuration of the chamfers 35, on account of which the efficiency of the circulating flow 24 and of the side-channel compressor 1 can be improved.

In terms of the design embodiment of the side-channel compressor 1 according to the invention, having the at least one side-channel 19, it is moreover advantageous that the gaseous medium can continue to flow through the side channel 19 in the event of a defect of the side-channel compressor 1, even when the compressor wheel 2 is stationary and there is thus the risk that the conveying through the fuel cell system 37 by virtue of a defective side-channel compressor 1 leads to a complete breakdown.

Figure 5:
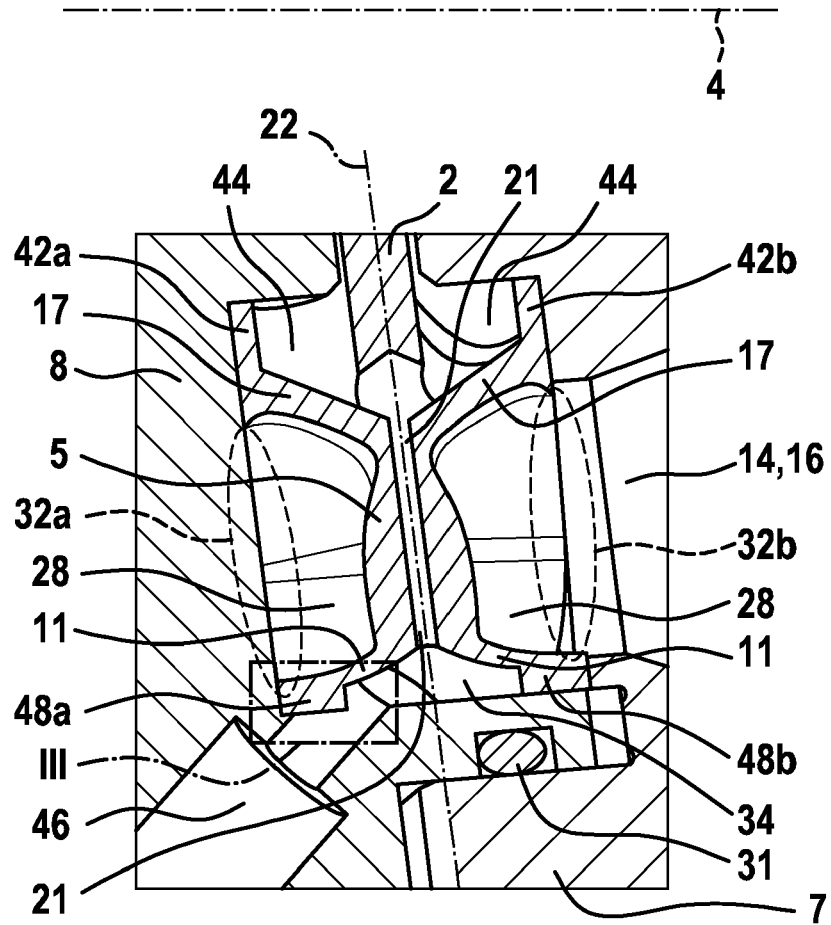
FIG. 5 shows a fragment of the side-channel compressor according to the invention, said fragment being identified by II in FIG. 1.

A fragment of the side-channel compressor 1 which shows the compressor wheel 2, the housing upper part 7, and the housing lower part 8 is shown in FIG. 5, said fragment being identified by II in FIG. 1. The compressor wheel 2 herein has the outer delimitation ring 17 which in a radially inward manner delimits the region of the conveyor cells 28. The compressor wheel 2 moreover has the inner delimitation ring 11 which in a radially outward manner delimits the region of the conveyor cells 28. The inner delimitation ring 17 and the outer delimitation ring 11 herein run about and/or in the compressor wheel 2 so as to be rotationally symmetrical to the rotation axis 4.

Furthermore, the compressor wheel 2 in the region of the inner delimitation ring 17 has at least one inside encircling annular bead 42a,b which runs in particular at least in an approximately radial manner to the rotation axis 4 and which runs on that side of the inner delimitation ring 17 that faces the rotation axis 4. Moreover, the at least one inside encircling annular bead 42a,b in an axial manner and/or radial manner to the rotation axis 4 also bears on the housing upper part 7 and/or the housing lower part 8. The compressor wheel 2 in the region of the outer delimitation ring 11 has at least one outside encircling annular bead 48a,b which runs in particular at least in an approximately radial manner to the rotation axis 4 and which runs on that side of the outer delimitation ring 11 that faces away from the rotation axis 4. It is advantageous herein that it is prevented by the outer delimitation ring 11 and/or the at least one annular bead 48a,b that the gaseous medium including heavy component parts arising is moved out of the region of a separation chamber 34 into the region of the side channel 19 and/or of the conveyor cell 28, and an at least partial encapsulation is thus achieved. It is furthermore prevented on account thereof that the gaseous medium including heavy component parts arising can invade the internal chamber 44 of the side-channel compressor 1 and thus damage the components, i.e. the drive 6 and/or the bearings 27 and/or the drive shaft 9. In the case of the electric drive 6, an ingress of the heavy component part water or hydrogen can lead to electrical shorting and/or to damage to the electrical or magnetically soft components of the drive 6. This can restrict the operation of the entire side-channel compressor 1 and even lead to a failure.

Improved guiding of the compressor wheel 2 in the housing 3, in particular in the region of the conveyor cells 28, can be achieved in that the compressor wheel 2 by way of the at least one outside encircling annular bead 48a,b and/or the at least one inside annular bead 42a,b bears on the housing upper part 7 and/or the housing lower part 8. This is advantageous in the event of shocks and impacts which arise during the operation of the side-channel compressor 1, for example by virtue of pressure peaks or of a back pressure arising in the fuel cell system 37. The stress on the bearings 27 and/or the drive 6 can be reduced on account thereof, since a majority of the impact forces, axial forces, and radial forces that arise in the operation of the side-channel compressor 1 can already be discharged into the housing 3 by way of the respective annular beads 42a,b; 48a,b.

It is moreover shown in FIG. 5 that the compressor wheel 2 has a connection bore 21 which in a radial manner to the rotation axis 4 runs through at least one blade 5. Furthermore shown is a second symmetry axis 22 which runs in an orthogonal manner to the rotation axis 4 and a symmetrically central manner through the section geometry of the blade 5, wherein the second symmetry axis 22 represents in particular the mirror axis of the section geometry. The connection bore 21 herein runs in a radial manner to the rotation axis 4 and connects the internal chamber 44 to the at least partially encapsulated separation chamber 34. The connection bore 21 herein runs in an axial manner to the second symmetry axis 22, wherein the second symmetry axis 22 represents in particular the centerline of the connection bore 21.

The encapsulated separation chamber 34 is situated on that side of the outer delimitation ring 11 that faces away from the rotation axis 4, wherein the separation chamber 34 is situated in particular in a radial manner to the rotation axis 4, between the outer delimitation ring 11 and the housing upper part 7 and/or the housing lower part 8. Furthermore, the separation chamber 34 is configured so as to at least partially encircle the rotation axis 4 between the housing 3 and the outer delimitation ring 11. On account of the configuration of said separation chamber 34 it is possible that the heavy component parts can be discharged from the gaseous medium and be collected in said separation chamber 34. The heavy component parts are thus dissipated away from the region of the at least one side channel 19 and of the conveyor cell 28 and collected in the region of the separation chamber 34. Moreover, by virtue of the embodiment of the side-channel compressor 1 according to the invention, having the radial connection bore 21, the gaseous medium, and/or heavy component parts thereof which were able to invade the region of the internal chamber 44 of the side-channel compressor 1, can be discharged from the internal chamber 44 to the separation chamber 34. Said heavy component parts of the gaseous medium can be, for example, undesirable waste products and/or byproducts from the operation of the fuel cell system 37, such as for example nitrogen or water. The conveying and compressing effect of the side-channel compressor 1 can be increased by discharging the heavy component parts, since the proportion of the gaseous medium to be conveyed, in particular hydrogen which is required for generating the electric current, for example in a fuel cell stack, is increased in the conveyor cell 28 and the side channel 19. On account thereof, the efficiency factor of the side-channel conveyor 1 can be increased since no heavy component parts which are undesirable in the operation have to be conjointly conveyed. On account of the disposal of the connection bore 21 as a connection bore 21 that runs in a radial manner to the rotation axis 4 and through one of the blades 5 of the compressor wheel 2, the effect of the centrifugal force can moreover be utilized when directing the heavy component parts outward. This centrifugal effect results in a rotation of the compressor wheel 2, wherein the centrifugal force is directed radially outward from the rotation axis 4 and herein acts by virtue of the dead weight of the heavy component parts of the gaseous medium to be conveyed. The heavy component parts that are situated in the internal chamber 44 of the side-channel compressor herein, by virtue of the centrifugal force are urged from the internal chamber 44 through the connection bore 21 to the separation chamber 34. Moreover, the connection bore 21 runs completely through the respective blade 5 of the compressor wheel 2 and herein is completely enclosed by the material of the blade 5.

It is advantageous herein that directing in a self-acting outward manner through the discharge channel 46 without any further measure such as, for example, mechanical pumping, takes place herein on account of the effect of gravity and/or centrifugal force on the heavy component parts of the gaseous medium that are collected in the separation chamber 34. The effect of the automatic dissipation of the heavy component parts in an outward manner by way of the discharge channel 46 by virtue of gravity and/or centrifugal force is also reinforced in that heavy component parts continue to flow into the separation chamber 34 in the operation of the side-channel compressor 1, and on account thereof push the heavy components parts already in situ through the discharge channel 46. The risk of damage to the rotating components, in particular the compressor wheel 2 or the bearings 27, is reduced on account thereof. This damage can be caused in that remaining heavy component parts, such as for example water, in the switched-off state of the fuel cell system 37 and at low ambient temperatures lead to the formation of ice bridges which can damage said components when starting the side-channel compressor 1. This damage is prevented by dissipating the heavy component parts by way of the discharge channel 46.

The blade 5 moreover has an opening 32 of the conveyor cell 28, wherein two openings 32*a,b* are shown in the exemplary embodiment of the side-channel compressor 1 shown in FIG. 5. The conveyor cell 28 herein has the two openings 32*a,b* in a radial manner in relation to the second symmetry axis 22. It is furthermore shown in FIG. 5 that the gas inlet opening 14 or the gas outlet opening 16 can in each case be situated in the region of the opening 32*a,b* of the conveyor cell 28, depending on the rotary position of the compressor wheel 2 in the rotating direction 20.

It is furthermore shown in FIG. 5 that the discharge channel 46 is situated on that side of the encapsulated separation chamber 34 that faces away from the rotation axis 4 in the housing upper part 7 and/or in the housing lower part 8 and/or between the housing upper part 7 and the housing lower part 8. The discharge channel 46 herein is situated at the geodetically lowest point in the housing upper part 7 and/or in the housing lower part 8 and/or between the housing upper part 7 and the housing lower part 8, in particular in the acting direction of gravity, wherein the discharge channel 46 runs in particular so as to be inclined at an angle in relation to the rotation axis 4.

The formation of liquid water on account of condensation from the gaseous medium can arise in the region of the side channel 19 and/or of the conveyor cell 28 in the operation of the side-channel compressor 1. The water and/or other heavy component parts, such as for example nitrogen, conjointly with the gaseous medium herein are accelerated and set in motion in the rotating direction 20 on account of the rotation of the compressor wheel 2 and of the conveyor cell 28. Higher centrifugal forces in a radial manner to the rotation axis 4 act on the water than on the gaseous medium herein, on account of which a centrifugal separation takes place and the water from the side channel 19 in the outflow direction V moves between the housing 3 and the outside annular bead 48*a,b* of the compressor wheel 2 through to the separation chamber 34. In addition to the heavy component part water, further heavy component parts, such as for example nitrogen, can also be discharged. The additional discharge channel 46 which in turn could be connected to a water separator of the fuel cell system 37, so as to thus dissipate the liquid water from the side-channel compressor 1, is advantageously situated at the geodetically lowest point of the separation chamber 34.

The installed position of the side-channel compressor 1 in the vehicle herein by virtue of the requirement variance in different vehicles and different applications herein is largely irrelevant since the position and the profile of the discharge channel 46 can be incorporated in the housing 3 in an almost unrestricted manner such that the discharge channel 46 always runs in the acting direction of gravity. It is guaranteed on account thereof that a largest possible variance in terms of installed positions in particular in different fuel cell systems 37 and/or vehicles and/or customers can be covered in that the variance adaptation is implemented only by incorporating the discharge channel 46 at a specific angle in the housing 3. However, the exact installed position of the side-channel compressor 1 in the vehicle herein has to be known prior to production and assembly, since the discharge channel 46 is incorporated in the housing 3 by machine, prior to the assembly of the components of the side-channel compressor 1. Moreover, no functional elements or components, such as for example further channels in the housing 3 of the side-channel compressor which would be impeded by the profile region of the discharge channel 46, must be provided in the profile region of the discharge channel 46 in the side-channel compressor 1 and the component periphery of the side-channel compressor on the fuel cell system 37. The position and the vector and/or the profile of the discharge channel 46 in the housing 3 herein can be adapted in two ways in such a manner that a largest possible variance in terms of installed positions of the side-channel compressor is derived, while the profile of the discharge channel 46 consistently runs in the acting direction of gravity, independently of the installed position of the side-channel compressor 1. On the one hand, the discharge channel 46 can be almost freely positioned so as to encircle the rotation axis 4 on the encapsulated separation chamber 34 in the housing 3, depending on how completely encirculating the separation chamber 34 has been configured about the rotation axis 4 between the housing 3 and the outer delimitation ring 11. On the other hand, the angle in relation to the rotation axis 4 by way of which the discharge channel 46 runs from the separation chamber 34 through the housing 3 can be disposed in an angular range from almost 0° to 180°, in particular in a range from 30° to 150°.

Figure 6:
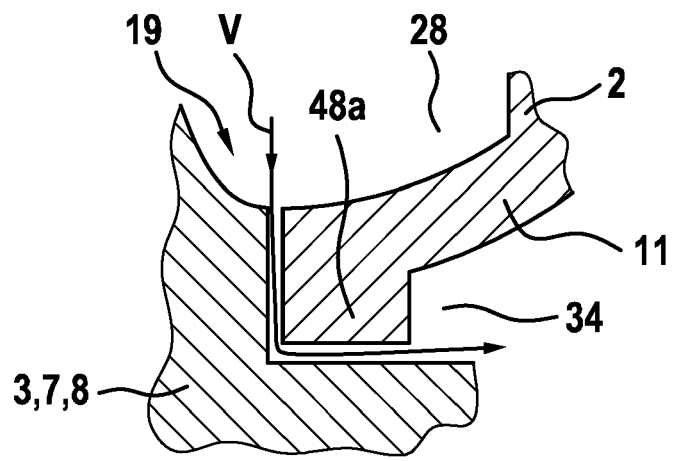
FIG. 6 shows a fragment of a compressor chamber, said fragment being identified by III in FIG. 5.

FIG. 6 shows a fragment of the compression chamber 30 having the compressor wheel 2 and the housing 3, said fragment being identified by III in FIG. 5. The housing 3 herein can be configured either as a housing upper part 7 or as a housing lower part 8. Moreover shown are the regions of the side channel 19 and of the conveyor cell 28 which are configured between the housing 3 and the compressor wheel 2. Furthermore illustrated is the separation chamber 34 which is configured between the outer delimitation ring 11 of the compressor wheel 2 and the housing 3.

It is shown in FIG. 6 herein that the region of the side channel 19 and/or of the conveyor cell 28 is at least partially encapsulated in relation to the separation chamber 34, in particular by means of the outer delimitation ring 11 and/or of the at least one outside annular bead 48. It is prevented by virtue of said at least partial encapsulation that the collected heavy component parts from the separation chamber 34 can flow, in particular flow back, between the housing 3 and the compressor wheel 2 into the region of the side channel 19 or of the conveyor cell 28. As is shown in FIG. 6, an at least limited outflow in the other direction, in particular in an outflow direction V, is however possible, wherein the heavy component parts from the region of the side channel 19 and/or of the conveyor cell 28 flow between the compressor wheel 2, in particular the outside annular bead 48a,b, and the housing 3 through to the separation chamber 34. Only the heavy components from the side channel 19 and/or the conveyor cell 28 herein flow in the outflow direction V to the separation chamber 34, since said outflow takes places by virtue of centrifugal forces when operating the side-channel compressor 1 and when rotating the compressor wheel 2. The centrifugal force herein acts in a sufficiently strong manner only on the heavy component parts of the gaseous medium, but not on the hydrogen which is relatively light, so as to push said heavy component parts in the outflow direction V through the gap between the housing 3 and the compressor wheel 2 to the separation chamber 34. The heavy component parts herein, facilitated by the rotating movement of the compressor wheel 2, flow between the outside encircling annular bead 48 of the compressor wheel 2 and the housing 3 through to the separation chamber, since a relative movement between the outside annular bead 48 and the housing 3 is present herein. However, since said centrifugal force does not act on the heavy components in the region of the separation chamber 34, since said heavy components are not in motion, in particular a rotating motion, and the separation chamber 34 in a radial manner to the rotation axis 4 is situated outside the side channel 19 and/or the conveyor cell 28, a return flow from the separation chamber 34 into the at least one side channel 19 and/or the conveyor cell 28 is prevented. An outflow of the heavy components from the region of the conveyor cell 28 and/or of the side channel 19 is not possible by virtue of the gap width between the compressor wheel 2 and the housing 3 in the case of an inactive side-channel compressor 1, in particular in the case of a stationary compressor wheel 2, since no or only very minor centrifugal forces act on the heavy component parts in this state.

The invention is not limited to the exemplary embodiments described herein and the aspects highlighted herein. Rather, a multiplicity of modifications which are within the scope of the activities of a person skilled in the art are possible within the range set forth by the claims.

The invention claimed is:

1. A side-channel compressor (1) for a fuel cell system (37) for conveying and/or compressing a gas, the side-channel compressor comprising
a housing (3), wherein the housing (3) has a housing upper part (7) and a housing lower part (8),
a compressor chamber (30) which is situated in the housing (3) and which has at least one encircling side channel (19),
a compressor wheel (2) which is situated in the housing (3) and which is disposed so as to be rotatable about a rotation axis (4), wherein the compressor wheel (2) on a circumference thereof has blades (5) which are disposed in a region of the compressor chamber (30), and
a gas inlet opening (14) and a gas outlet opening (16) which are in each case configured on the housing (3) and which by way of the compressor chamber (30) are fluidically connected to one another,
wherein the compressor wheel (2) has at least one connection bore (21) which so as to be radial to the rotation axis (4) runs through at least one of the blades (5) and which connects an internal chamber (44) of the side-channel compressor (1) to a separation chamber (34).

2. The side-channel compressor (1) as claimed in claim 1, characterized in that the compressor wheel (2) in the region of the compressor chamber (30) between the two neighboring blades (5) configures in each case one conveyor cell (28) which in a radial manner to the rotation axis (4) is outwardly delimited by an outer encircling delimitation ring (11) and is inwardly delimited by an inner encircling limitation ring (17), wherein the conveyor cell (28) in a direction of the rotation axis (4) has at least one opening (32a,b) wherein the outer and the inner delimitation ring (11, 17) run in each case so as to be rotationally symmetrical to the rotation axis (4).

3. The side-channel compressor (1) as claimed in claim 1, characterized in that the connection bore (21) runs completely through a respective blade (5) of the compressor wheel (2).

4. The side-channel compressor (1) as claimed in claim 1, characterized in that a region of the conveyor cell (28) and/or of the at least one side channel (19) are/is at least partially encapsulated in relation to the internal chamber (44).

5. The side-channel compressor (1) as claimed in claim 4, characterized in that the compressor wheel (2) on the inner delimitation ring (17) has at least one inside encircling annular bead (42a,b) which runs on a side of the inner delimitation ring (17) that faces the rotation axis (4), wherein the at least partial encapsulation of the region of the conveyor cell (28) and/or of the at least one side channel

(19) in relation to the internal chamber (44) is achieved by way of the at least one inside encircling annular bead (42a,b).

6. The side-channel compressor (1) as claimed in claim 2, characterized in that a region of the conveyor cell (28) and/or of the at least one side channel (19) are/is at least partially encapsulated by the separation chamber (34).

7. The side-channel compressor (1) as claimed in claim 6, characterized in that the compressor wheel (2) in a region of the outer delimitation ring (11) has at least one outside encircling annular bead (48a,b) which runs on a side of the outer delimitation ring (11) that faces away from the rotation axis (4), and wherein an at least partial encapsulation of the region of the conveyor cell (28) and/or of the at least one side channel (19) in relation to the separation chamber (34) is achieved by way of the at least one annular bead (48a,b).

8. The side-channel compressor (1) as claimed in claim 5, characterized in that the at least one inside encircling annular bead (42a,b) in an axial manner and/or radial manner to the rotation axis (4) bears on the housing upper part (7) and/or the housing lower part (8).

9. The side-channel compressor (1) as claimed in claim 8, characterized in that the at least one outside encircling annular bead (48a,b) in an axial manner and/or radial to the rotation axis (4) bears on the housing upper part (7) and or the housing lower part (8).

10. The side-channel compressor (1) as claimed in claim 1, characterized in that a discharge channel (46) is situated on a side of the separation chamber (34) that faces away from the rotation axis (4) in the housing upper part (7) and/or in the housing lower part (8) and/or between the housing upper part (7) and the housing lower part (8).

11. The side-channel compressor (1) as claimed in claim 10, characterized in that the discharge channel (46) is situated at a geodetically lowest point in the housing upper part (7) and/or in the housing lower part (8) and/or between the housing upper part (7) and the housing lower part (8).

12. The side-channel compressor (1) as claimed in claim 1, wherein the gas inlet opening (14) and the gas outlet opening (16) are fluidically connected to one another by way of the at least one side channel (19).

13. The side-channel compressor (1) as claimed in claim 1, characterized in that the connection bore (21) runs completely through a respective blade (5) of the compressor wheel (2), wherein the connection bore (21) is completely enclosed by a material of the blade (5).

14. The side-channel compressor (1) as claimed in claim 1, characterized in that a region of the conveyor cell (28) and/or of the at least one side channel (19) are/is at least partially encapsulated in relation to the internal chamber (44), wherein the internal chamber (44) is situated in a radial manner to the rotation axis (4), between the inner delimitation ring (17) and the rotation axis (4).

15. The side-channel compressor (1) as claimed in claim 4, characterized in that the compressor wheel (2) on the inner delimitation ring (17) has at least one inside encircling annular bead (42a,b) which runs in a radial manner to the rotation axis (4) and which runs on a side of the inner delimitation ring (17) that faces the rotation axis (4), wherein the at least partial encapsulation of the region of the conveyor cell (28) and/or of the at least one side channel (19) in relation to the internal chamber (44) is achieved by way of the at least one inside encircling annular bead (42a,b).

16. The side-channel compressor (1) as claimed in claim 2, characterized in that a region of the conveyor cell (28) and/or of the at least one side channel (19) are/is at least partially encapsulated by the separation chamber (34), wherein the separation chamber (34) is situated in a radial manner to the rotation axis (4), between the outer delimitation ring (11) and the housing upper part (7) and/or the housing lower part (8).

17. The side-channel compressor (1) as claimed in claim 6, characterized in that the compressor wheel (2) in a region of the outer delimitation ring (11) has at least one outside encircling annular bead (48a,b) which runs in a radial manner to the rotation axis (4) and which runs on a side of the outer delimitation ring (11) that faces away from the rotation axis (4), and wherein an at least partial encapsulation of the region of the conveyor cell (28) and/or of the at least one side channel (19) in relation to the separation chamber (34) is achieved by way of the at least one annular bead (48a,b).

18. The side-channel compressor (1) as claimed in claim 10, characterized in that the discharge channel (46) is situated at a geodetically lowest point in the housing upper part (7) and/or in the housing lower part (8) and/or between the housing upper part (7) and the housing lower part (8), in the acting direction of gravity, wherein the discharge channel (46) runs so as to be inclined at an angle in relation to the rotation axis (4).

* * * * *